O. E. PAGAN.
SHAVING SOAP RECEPTACLE.
APPLICATION FILED MAY 19, 1909.
962,091.
Patented June 21, 1910.
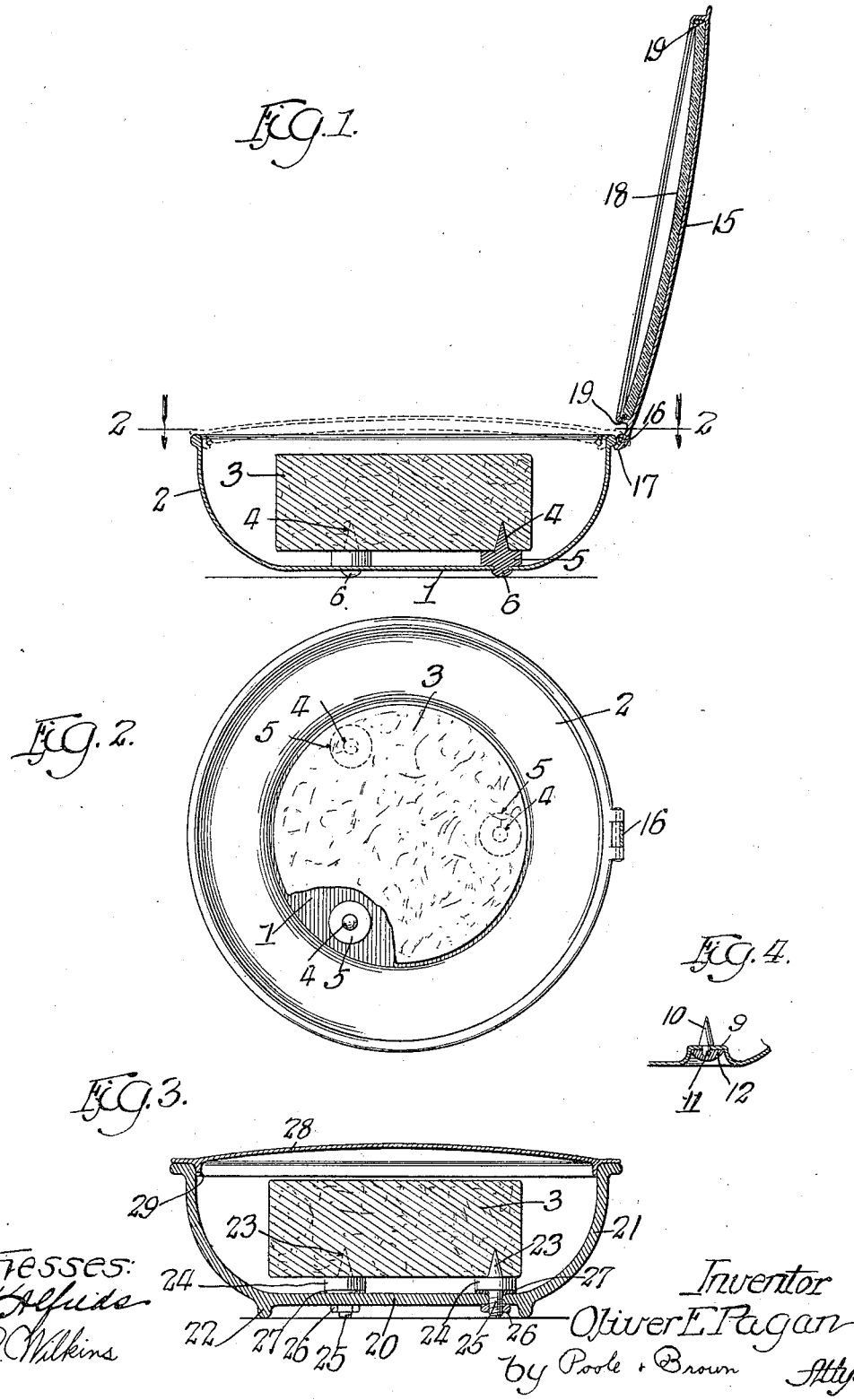

they receptacle.

UNITED STATES PATENT OFFICE.

OLIVER E. PAGAN, OF WASHINGTON, DISTRICT OF COLUMBIA.

SHAVING-SOAP RECEPTACLE.

962,091.     Specification of Letters Patent.     Patented June 21, 1910.

Application filed May 19, 1909. Serial No. 496,901.

*To all whom it may concern:*

Be it known that I, OLIVER E. PAGAN, a citizen of the United States, and a resident of Washington, District of Columbia, United States of America, have invented certain new and useful Improvements in Shaving-Soap Receptacles; and I do hereby declare that the following is a full, clear, and exact description thereof, reference being had to the accompanying drawings, and to the numerals of reference marked thereon, which form a part of this specification.

This invention relates to a novel article in the nature of a holder or receptacle for shaving soap adapted to hold a cake of such soap in a manner convenient for making lather by the use of a shaving brush, for the protection of the soap when not in use and its preservation in a cleanly and sanitary condition.

A shaving soap receptacle made in accordance with my invention differs in form from what is ordinarily known as a "shaving mug" by being made only slightly deeper than the cake of soap to be placed therein, and considerably larger in diameter than the same, and is provided on the central part of its bottom with spikes or studs adapted to hold the cake of soap centrally in the receptacle and above the bottom of the same, so as to afford an open space beneath the cake of soap, in which surplus water may accumulate, and in which air may circulate for drying the soap between shaves, and to also afford an open space around the sides of the soap to facilitate the drying of the same and which permits the shaving brush to act on the sides, as well as the top, of the cake in making lather.
The invention consists in the matters hereinafter described and pointed out in the appended claim.

In the accompanying drawings illustrating my invention: Figure 1 is a view in central vertical section of a shaving soap receptacle embodying my invention, made of sheet metal and provided with a hinged lid or cover. Fig. 2 is a plan view of the body of the receptacle, with the hinged connection between the cover and the body in section, taken upon line 2—2 of Fig. 1. Fig. 3 is a sectional view of a form of receptacle having a detachable cover, and which is made of porcelain or the like. Fig. 4 is a detail view of a portion of the bottom of a sheet-metal receptacle, which is like that shown in Figs. 1 and 2, with the exception of the means for forming the holding studs or prongs and the supporting shoulders on the bottom of the receptacle.

As shown in Figs. 1 and 2, the body of the receptacle is made of sheet-metal and has the form of a flat or shallow, circular dish which is much larger in diameter than the cake of soap to be inserted therein, and only slightly deeper than the thickness of such cake of soap. The bottom wall 1 of the receptacle is flat while its side wall 2 extends on a curved line from the said bottom wall to its upper edge. 3 indicates a cake of soap within the receptacle, the same having the usual form of a flat circular disk. The flat bottom wall 1 of the receptacle is of about the same diameter as the cake of soap, while the top edge or margin of the side wall 2 is much larger in diameter than the cake of soap, leaving an annular space of considerable width around the cake of soap. Secured to and rising from the said bottom wall of the receptacle, at the central part of the receptacle, are a plurality of upright holding prongs or spikes 4, 4, 4, of upwardly tapered form, which serve to hold the cake centrally in the receptacle and prevent it from turning in applying the shaving brush thereto. The receptacle is provided at the bases of the spikes with upwardly facing supporting shoulders, formed by means of annular flanges 5, 5, 5 on said spikes. Said shoulders form supporting surfaces on which the bottom surface of the cake rests when it is impaled on the said spikes, and which serve to support the cake at a distance above the said bottom wall of the receptacle, leaving an open space beneath the cake in which surplus water may accumulate, and which facilitates the drying of the soap between shaves. The cake of soap being held centrally in the receptacle by said spikes, and the rim of the receptacle being much larger in diameter than the part of the bottom wall which is provided with the holding spikes, and over which the cake is supported, an air-space is provided both beneath and around the cake, permitting the same to dry and keeping it in good condition. The low side wall of the receptacle in connection with the open space around the cake of soap, enables the shaving brush, when rubbed against the cake with a circular motion for making lather, to act on the sides as well as upon or over the entire top surface of the cake, so that a greater part of the cake will be used than when the brush is applied to the central part of the top of the cake only, as in the case of an ordinary mug. As shown in said Figs. 1 and 2, the flanges 5, 5, 5 are formed in or made integral with the spikes, and the latter are secured in the bottom wall 1 by means of integral studs 6 which are inserted through holes in the said bottom wall and are upset or riveted against the under surface of the bottom wall so as to firmly secure the studs to the bottom wall and make tight joints between the wall and the flanges 5, 5, 5.

In Fig. 4 is shown a somewhat different form of construction in a supporting shoulder and spike, adapted for use in connection with a sheet-metal receptacle. In this instance the bottom wall 1 is shaped to form an elevated flat portion 9, and a spike 10 of upwardly tapered form is secured to said elevated part 9, which latter forms an upwardly facing shoulder surrounding the base of the stud. The stud in this instance is provided at its lower end with a projecting part 11 that is inserted through a hole in the elevated part 9 of the bottom wall, and is secured therein by a mass of solder 12, or by other securing means affording a tight joint between the stud and the bottom wall.

The sheet-metal disk or receptacle shown in Figs. 1 and 2 is provided with a hinged cover or lid 15 connected with one side of the receptacle at its upper margin by means of a hinge 16. The part of the hinge attached to the lid is provided with a downwardly extending prong 17, adapted for contact with the outer surface of the rim of the receptacle below the hinge when the lid is open, so as to support said lid in an upwardly and outwardly inclined position, as shown in Fig. 1. The lid is preferably made of convex form so as to provide ample space for the cake of soap in a receptacle the body of which is of minimum depth. Said lid 15 is provided on its inner face with a mirror 18, preferably of concave form and consisting of a piece or disk of glass secured on its inner surface and held in place on the lid by means of an annular rim 19 on the same engaging the margins of the mirror.

By reason of the rim of the receptacle being large in diameter, the lid 15 may be made of sufficient size to support a mirror large enough in diameter to be of practical utility. It will be manifest that the lid provided with a mirror could not be used on a shaving mug of ordinary construction, or of the usual diameter, because in such case the mirror would be too small to be of any benefit for actual use for shaving purposes. It will, of course, be understood that the receptacle when made shallow and of large diameter affords a suitable base or support for the mirror and serves to sustain the latter in position for convenient use in shaving.

Fig. 3 shows a receptacle for shaving soap embodying the same general features of construction above described, but in which the body of the receptacle is made of porcelain or the like. In this instance, the receptacle has a flat bottom wall 20 and a curved annular side wall 21, the bottom wall being provided with an annular base flange 22. The holding spikes 23 employed in this instance are like those illustrated in Fig. 1, said spikes having each an annular, integral flange 24, the top surface of which forms an upwardly facing shoulder or supporting surface for contact with the bottom surface of the cake of soap. In this instance each spike 23 is provided with a downwardly extending stem 25 which extends through a hole in the bottom of the receptacle, and the lower end of which is screw-threaded and provided with a clamping nut 26. A rubber ring or gasket 27 is applied between the base of the flange 24 and the bottom of the receptacle to make a water tight joint between the parts. The receptacle shown in said Fig. 3 is provided with a lid or cover 28 which is provided at its margin with an annular flange 29 adapted to fit within the top margin of the side wall 21 of the dish so as to secure the lid or cover to the latter, while permitting its convenient removal.

A principal feature of my invention is embraced in a shallow or low receptacle having in the central part of its bottom wall holding spikes and upwardly facing, supporting shoulders by which a cake of soap may be held centrally within the receptacle, and above said bottom wall; said receptacle being of large diameter in proportion to its depth, with its side wall at such distance outside of the central part of the bottom wall, containing said spikes, as to afford an annular space around the cake of soap. A shaving soap receptacle embracing these features possesses several advantages as compared with shaving mugs, as heretofore made, which will be understood from the following: In order to satisfactorily produce lather for shaving purposes, it is necessary that the cake of soap should be held stationary while the brush should be used in connection with a limited supply of water and applied to the cake with a circular or stirring motion; friction between the soap and brush and a limited quantity of water being essential to the production of a good lather. Moreover, when shaving soap is used by a man who shaves himself and the soap stands idle between shaves, it is important that the soap should quickly dry and remain dry, because if its stands in contact with water in the bottom of the receptacle the soap is made soft and lifeless and fails to produce a good lather. In a receptacle made as described, the cake of soap is held by the spikes above the bottom wall of the receptacle, so that it will be above and free from contact with any water in the bottom of the receptacle, while at the same time spaces for the circulation of air are afforded beneath and around the cake so that the soap quickly dries and is kept in the best possible condition for use. In the use of a deep receptacle, such as a shaving mug, the brush can only be applied to the top surface of the cake, with any degree of effectiveness, and as a result the central part of the cake is first removed, leaving a ring which, when dry, becomes broken up and must be thrown away. Inasmuch as the top edge of the side wall of applicant's receptacle is only slightly above the level of the top of the cake, the brush may act on the entire top surface of the cake, and also to a desired extent on its sides, it being manifest that the brush may be inserted in said annular space in an outwardly inclined position so as to bring the ends of the bristles thereof against the marginal part of the top and the sides of the cake, so that as much soap may be removed from the margin as from the center of the cake, when making the lather. In the use of applicant's receptacle, therefore, soap is taken from the entire top surface of the cake, and to some extent around its sides, so that the cake will remain impaled on the spikes until little of it remains with the result that a considerable saving in the soap is secured. In a receptacle made as described, it follows that the cake of soap will last much longer, both because it is kept dry and because more of it is used, than in the use of the mugs heretofore employed. Moreover, surplus water flowing from the brush may accumulate in the bottom of the receptacle beneath the soap, without contact with the latter, thereby saving the trouble of pouring off such surplus water while shaving; the water in the bottom of the receptacle being available for wetting the brush when necessary. By reason of the presence of the annular space surrounding the cake the brush may easily reach the bottom of the said space, to take up water introduced into the receptacle and remaining in the bottom of the same, as said brush is carried around the cake, with the result that exactly the desired or proper quantity of water may be used in making the lather. By the construction described, moreover, the cake of soap may be easily removed from the spikes, when necessary for cleaning the receptacle, by inserting the fingers in the annular space outside of the cake and grasping the sides of the cake with the fingers. Moreover, in cleaning the receptacle after shaving, water may be caused to flow through the spaces around and beneath the cake, so as to wash out the remaining lather and effectively clean the soap and receptacle; this being important from a sanitary point of view, especially in a barber shop where the soap and receptacle should often be cleaned. The cleansing of the receptacle and the cake of soap may be most easily performed by permitting water from a faucet to flow into the receptacle, around and beneath the cake. Important advantages are obtained from a receptacle made as described, from a sanitary standpoint; it being manifest that, because of the facility with which the soap and receptacle may be thoroughly cleaned after use, the accumulation of deleterious matters in the receptacle may be easily avoided.

As compared with the ordinary shaving mug, the depth of which is two or three times the thickness of the cake of soap placed therein, and which is very much larger and heavier than required for its intended purpose, a receptacle made as described is a great convenience for the use of travelers, because it is light in weight, occupies little space and may be easily packed in a traveling bag or the like.

The presence of a lid or cover is of special advantage when the receptacle is used by travelers, the receptacle when provided with a cover being more like an ordinary receptacle for toilet soap than a shaving mug. Moreover, by reason of the relatively large diameter of the receptacle, the said lid may be made from two and a half to three inches in diameter and may therefore be provided with a mirror large enough for practical use in shaving. The provision of a mirror in the lid is of special advantage for use when traveling or in places where a mirror is not available, and also in cases in which it is desirable that the mirror should be placed in certain positions to receive suitable light.

I claim as my invention:—

The combination with a cup-shaped receptacle; of a plurality of spaced lugs rising a considerable distance above the inner surface of the bottom of the receptacle, each lug being provided with a broad flat upper bearing face, and spurs rising centrally from the upper bearing faces of said lugs whereby a cake of soap will be maintained fixed in superposed position on the lugs at a considerable elevation above the plane of the bottom of the receptacle for free circulation of air beneath said soap cake.

In testimony, that I claim the foregoing as my invention I affix my signature in the presence of two witnesses, this 17th day of May A. D. 1909.

OLIVER E. PAGAN.

Witnesses:
 GEORGE R. WILKINS,
 G. J. BRYCE.